United States Patent [19]
Kieser

[11] 3,833,967
[45] Sept. 10, 1974

[54] FISH CLEANING BOARD
[76] Inventor: Lester C. Kieser, 1038 S. Shore Dr., Kansas City, Mo. 64151
[22] Filed: May 29, 1973
[21] Appl. No.: 364,702

[52] U.S. Cl. ................................................. 17/70
[51] Int. Cl. ............................................. A22b 5/14
[58] Field of Search ......... 17/66, 70; 119/103, 97 R

[56] References Cited
UNITED STATES PATENTS

| | | | |
|---|---|---|---|
| 1,259,109 | 3/1918 | Kugler et al. | 17/70 |
| 1,632,194 | 6/1927 | Possehl | 17/70 |
| 2,312,160 | 2/1943 | Haislip | 17/70 |
| 2,747,321 | 5/1956 | Thompson | 17/70 X |

Primary Examiner—Louis G. Mancene
Assistant Examiner—Robert F. Cutting
Attorney, Agent, or Firm—Schmidt, Johnson, Hovey & Williams

[57] ABSTRACT

A device for use in cleaning fish has a backup board against which the body of the fish is placed, a hook at one end of the board for holding the head of the fish, and a dual-purpose tool removably clamped on the board adjacent the opposite end thereof for confining the body of the fish during scaling or skinning thereof and, alternatively, for holding one side of the body raised from inside the body cavity during filleting. The tool may be moved along the board as necessary in order to accommodate fish of various sizes, and the tool may be removed from one side edge of the board and replaced upon the opposite side edge of the board with ease during the filleting.

9 Claims, 4 Drawing Figures

PATENTED SEP 10 1974 3,833,967
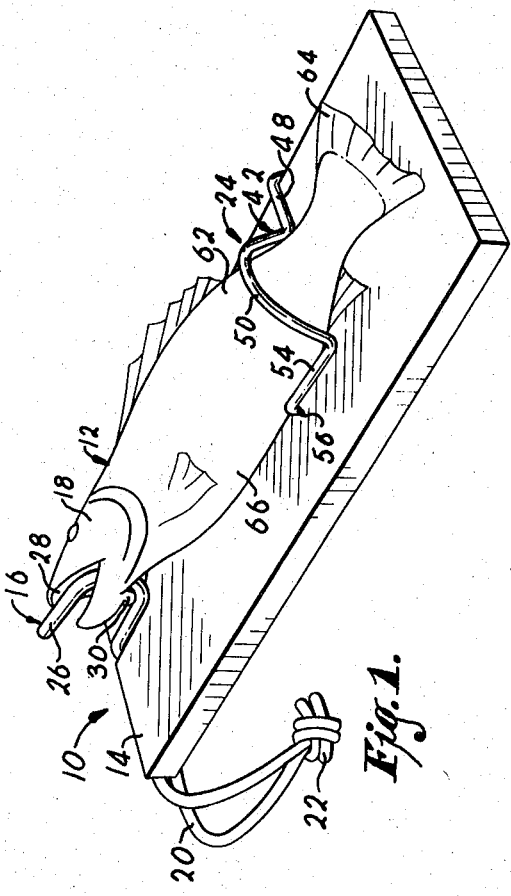
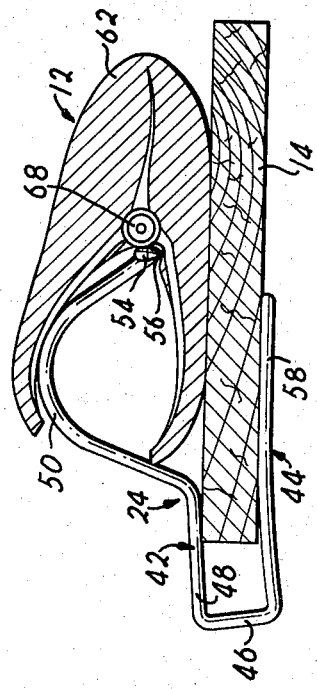
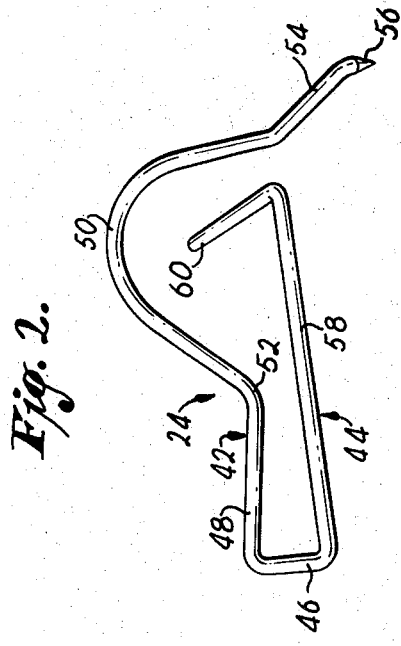
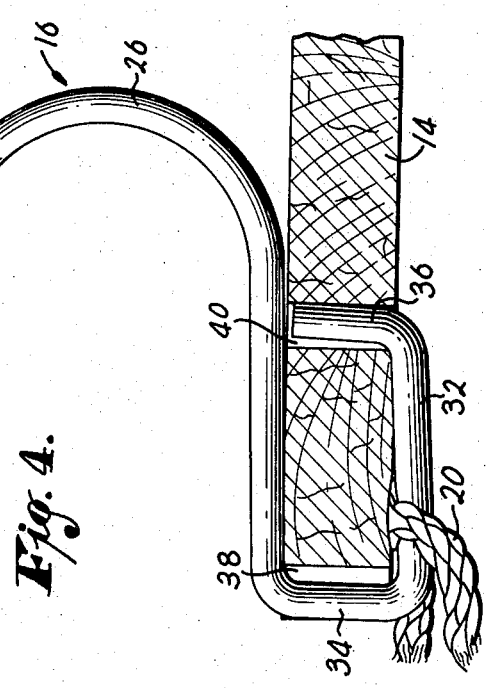

FISH CLEANING BOARD

Fish cleaning devices of various kinds have heretofore been provided in an effort to enable the user of the device to clean fish rapidly, thoroughly, and without personal injury to the user. Certain of these devices have utilized serrated clamping jaws that receive the tail of the fish in order to hold the same firmly against movement while the body of the fish is scaled or skinned, working from the tail toward the head. However, notwithstanding the use of the serrations or teeth on the clamping jaws, such devices have suffered from the inability to hold the sometimes slippery fish with sufficient tenacity to withstand the excessive forces often required to peel the outer skin of the fish away from the underlying meat thereof.

Moreover, prior devices have, for the most part, completely failed to provide improvements which facilitate filleting of the meat from the body of the fish. Where the fish is of sufficient size to warrant filleting, such is often the preferred manner of preparing the fish for consumption, in view of the absence of bones in the prepared fillet. Thus, the need to provide means by which the filleting process can be carried out successfully with optimum results, is apparent.

Therefore, it is one important object of the present invention to provide a device for use in cleaning fish which enables the user to carry out both the initial skinning or scaling phases of the process and the subsequent filleting steps thereof with ease and with optimum results.

A further important object of this invention is the provision of a device as aforesaid which utilizes a sturdy hook for the head of the fish that enters the gill flap area and exits the mouth of the fish so that the tough jawbone structure of the fish can be used to successfully resist the forces often imparted to the body of the fish during skinning or scaling thereof.

Another important object of the instant invention is to provide a special dual-purpose tool utilized in connection with the aforementioned device that serves to confine the body of the fish against lateral swinging thereof from the hook while the body is being skinned or scaled, and which then serves to successively support the meaty sides of the fish in raised condition from within the body cavity as the sides are being filleted.

Additional important objects of my invention include making the special tool adjustable along the body of the fish to accommodate various body sizes and to make the tool easily removable from and replaceable upon the backup board of the device to enable the tool to be switched from one side edge of the board to the opposite side edge when the fish is flipped over during the filleting.

IN THE DRAWING:

FIG. 1 is a perspective view of the device of the present invention in use;

FIG. 2 is a perspective view of the special dual-purpose tool which forms a part of the device;

FIG. 3 is an enlarged, vertical cross-sectional view through the device and fish thereon showing the special tool in its position for filleting of the fish; and FIG. 4 is an enlarged, fragmentary, vertical cross-sectional view through one end of the device illustrating details of the hook for the head of the fish.

The device 10 has particular utility for somewhat larger fish in excess of 1 pound, such as the fish 12, although it will be understood that the specific size of the fish to be cleaned is not a limiting factor with regard to the operativeness of the device 10.

The device 10 includes a flat backup member 14 which is preferably a length of board but may be of other than wooden material as necessary or desired; a relatively large hook at one end of board 14 for the head 18 of the fish 12; a line 20 tied in a closed loop by a knot 22 and secured to board 14 adjacent hook 16; and the special, dual-purpose tool 24 on board 14 adjacent the opposite end thereof. If desired, board 14 may be provided on its backside with feet (not shown) located at the four corners thereof.

The hook 16 has a main U-shaped portion 26 that enters the mouth 28 of fish 12 beneath a gill flap 30 thereof, and then exits mouth 28 after looping beneath jawbone structure (not shown) associated with mouth 28. Integral with portion 26 is a C-shaped segment 32 having parts 34 and 36 that extend through holes 38 and 40 respectively in board 14 to secure the hook 16 in place. The end of line 20 opposite knot 22 is looped around segment 32 between the latter and board 14 to secure line 20 to board 14.

The dual-purpose tool 24 is basically U-shaped, formed from a single length of heavy-gauge wire. Two legs 42 and 44 are thus presented and are hingedly interconnected by a bight 46 at one end for flexure of the legs 42 and 44 toward and away from one another. The normally top leg 42 has an inclined stretch 48 that leads from bight 46 until it merges with an upwardly projecting, arcuate arch 50, presenting a downwardly projecting knee 52 at the junction of stretch 48 and arch 50. As will become apparent, arch 50 is preferably arcuate, but may be polygonal if desired, presenting two or more corners without adversely affecting the principles of this invention. A stabilizer piece 54 extends laterally outwardly from the plane of leg 42 and has a downwardly projecting prong 56 at the outermost end thereof. The normally lower leg 44 is disposed within the same vertical plane as leg 42, having only a single straight stretch 58, terminated by a second laterally projecting stabilizer piece 60 extending in the opposite direction from that of stabilizer 54.

In use, the line 20 may be looped about the limb of a tree or other projecting structure, or alternatively, line 20 may be looped about a spike driven into a flat surface with the board 14 resting against such surface and spaced from the spike by the line 20. The fish 12 is placed on board 14 as shown, with the hook 16 passing through the gill flap 30 and mouth 28 as above described. Thereupon, the tool 24 may be grasped by the arch 50 and forced onto board 14 approximately as shown, with legs 42 and 44 disposed on opposite sides of board 14. By virtue of the resilient nature of legs 42 and 44, the latter separate, with resistance, from one another as tool 24 is being placed on board 14.

As the tool 24 is being mounted, the arch 50 is held upwardly a sufficient extent to allow leg 42 to slip over the body 62 of fish 12 adjacent the tail 64 thereof as shown, until the body 62 becomes received within arch 50. Preferably, the position of tool 24 along board 14 should be such that the body 62 is only confined within arch 50 rather than being clamped by the same against board 14. Thus, when tool 24 is in its proper position, the stabilizer piece 54 will bear against board 14 rather than against body 62. Adjustment of tool 24 in this respect is easily accommodated by simply pulling leg 42 upwardly a sufficient extent to allow tool 24 to slide along board 14 to its proper position.

With the tool 24 disposed as shown in FIG. 1, the fish 12 may be scaled or skinned without the latter escaping from hook 16 and tool 24. This is especially important where the fish is to be skinned, such as is the common practice for catfish, because the skin of catfish is particularly difficult to remove and an accidental slip will often cause the user's hand to be impaled upon one of the sharp fin bones of the catfish, hence producing a painful injury. With the head 18 securely held by hook 16, the skin may be grasped between the jaws of a set of pliers and pulled downwardly away from head 18 toward tail 64 with full assurance that fish 12 will be well confined against movement. By virtue of holding the fish 12 through hook 16 rather than through clamping means at tail 64, slippage of fish 12 from its proper cleaning position is virtually impossible.

The above process should be carried out on both sides of the fish 12 by simply disengaging the hook 16 from mouth 28, flipping fish 12 over, and then repeating the skinning or scaling steps. At this point, the belly 66 of fish 12 may be slit in order that tool 24 may be used as shown in FIG. 3 to fillet meat from body 12. Once the slit has been made, one side of body 62 is lifted a sufficient extent to allow entry of the arch 50 until stabilizer 54 is against the backbone 68 of fish 12 as shown in FIG. 3. In this condition, one side of body 62 will be held raised by arch 50, while the opposite side is held clamped against board 14 by stabilizer piece 54. In this latter connection, the prong 56 helps retain stabilizer piece 54 in its proper location within the body cavity of fish 12.

By having a side of body 62 raised, the meat may then be easily filleted from the bone structure of fish 12, producing a highly edible, bone-free fillet.

Once one side of body 62 has been filleted, tool 24 may be withdrawn from the body cavity of fish 12, removed from board 14, the fish 12 flipped over to reverse the positions of the sides of the body 62, and the tool 24 then reinserted back into the body cavity. The filleting step is then repeated on the newly raised side.

It will be appreciated that the tool 24 is firmly, yet removably secured onto board 14 by the resilient nature of legs 42 and 44, operating primarily through the stretches 48 and 58, and the stabilizer pieces 54 and 60. The effect is one of clamping rather than simply having the board 14 slipped loosely between legs 42 and 44. Moreover, during the filleting stage, the stabilizer piece 54 is held tightly against the lower side of body 62 by virtue of the knee 52 serving somewhat as a fulcrum for the arch 50 and stabilizer piece 54 disposed outwardly beyond knee 52.

Having thus described the invention, what is claimed as new and desired to be secured by letters Patent is:

1. A device for use in cleaning fish comprising:
a backup member having a pair of opposed ends and adapted to receive the body of a fish thereagainst extending between said ends;
means on said member engageable with the fish at the head of the latter for holding the head during cleaning of the fish; and
a dual-purpose tool on said member normally spaced from said head-holding means for cooperating with the latter to confine the body against movement during scaling or skinning thereof and, alternatively, for holding the sides of the body successively raised from the member during filleting of the body,
said tool having a downwardly opening retaining arch extending transversely of said member and adapted to be looped over the body for scaling or skinning and inserted into the body for filleting while the head of the fish is held by said holding means.

2. A device as claimed in claim 1, wherein said head-holding means includes a hook for the mouth of the fish.

3. A device as claimed in claim 1, wherein said arch is arcuate.

4. A device as claimed in claim 1, wherein said tool is provided with means yieldably biasing the arch toward said member.

5. A device as claimed in claim 1, wherein said tool is provided with means removably mounting the tool on said member.

6. A device as claimed in claim 5, wherein said mounting means includes spring-loaded clamping structure for receiving the member.

7. A device as claimed in claim 1 wherein said tool is generally U-shaped, having a pair of opposed, normally spaced-apart legs interconnected at one end by a bight and adapted to receive said member between the legs, one of said legs having said arch.

8. A device as claimed in claim 7, wherein said legs are resilient for removably clamping the member therebetween.

9. A device as claimed in claim 8, wherein each leg is provided with a member-engaging stabilizer extending laterally outwardly from the leg, said stabilizers projecting from said legs in opposite directions.

* * * * *